United States Patent [19]

Fraker et al.

[11] Patent Number: 5,434,789
[45] Date of Patent: Jul. 18, 1995

[54] GPS GOLF DIAGNOSTIC SYSTEM

[76] Inventors: William F. Fraker, 859 Bennett Ct., Carmel, Ind. 46032; Gary Bilsland, 6450 Watham Ct., Indianapolis, both of Ind. 46250

[21] Appl. No.: 132,703

[22] Filed: Oct. 6, 1993

[51] Int. Cl.⁶ .................... G01S 5/14; A63B 71/06; A63B 57/00
[52] U.S. Cl. .................... 364/460; 364/411; 364/561; 273/32 R; 273/32 H
[58] Field of Search ............ 364/449, 444, 410, 411, 364/561, 460; 342/357, 450, 451, 457; 273/32 R, 32 H

[56] References Cited

U.S. PATENT DOCUMENTS

| | | | |
|---|---|---|---|
| 4,815,020 | 3/1989 | Cormier | 364/709.11 |
| 4,864,592 | 9/1989 | Lee | 377/5 |
| 4,894,655 | 1/1990 | Joguet et al. | 340/988 |
| 4,910,677 | 3/1990 | Remedio et al. | 364/410 |
| 5,043,736 | 8/1991 | Darnell et al. | 342/357 |
| 5,056,106 | 10/1991 | Wang et al. | 375/1 |
| 5,077,557 | 12/1991 | Ingensand | 342/52 |
| 5,101,356 | 3/1992 | Timothy et al. | 364/449 |
| 5,148,179 | 9/1992 | Allison | 342/357 |
| 5,155,490 | 10/1992 | Spradley, Jr. et al. | 342/357 |
| 5,194,871 | 3/1993 | Counselman, III | 342/357 |
| 5,245,537 | 9/1993 | Barber | 364/410 |
| 5,266,958 | 11/1993 | Durboraw, III | 342/357 |
| 5,319,548 | 6/1994 | Germain | 364/410 |
| 5,324,028 | 6/1994 | Luna | 273/32 R |
| 5,364,093 | 11/1994 | Huston et al. | 273/32 R |

OTHER PUBLICATIONS

*GPS Technology and Opportunities*, Clyde Harris and Roy Sikorski Expo Comm China '92, Beijing, China, Oct. 30–Nov. 4, 1992.

*Primary Examiner*—Michael Zanelli
*Attorney, Agent, or Firm*—Woodard, Emhardt, Naughton, Moriarty & McNett

[57] ABSTRACT

A GPS golf diagnostic system for receiving radio signals from earth orbiting GPS satellites, determining the latitudinal, longitudinal and altitudinal coordinates of the diagnostic system, and computing the distance between these coordinates and a plurality of known positions is disclosed. The diagnostic system of the present invention utilizes the computed data for informing the user of the distance between the present position of the golf ball and known positions such as previous ball position, green location and pin position. The diagnostic system is further useful for keeping track of shot distances, clubs used, scores obtained on each hole and total game scores for a plurality of courses.

29 Claims, 10 Drawing Sheets

GPS GOLF DIAGNOSTIC SYSTEM

BACKGROUND OF THE INVENTION

This invention relates generally to the use of radio signals transmitted by earth orbiting satellites to determine the position of a point in space and more specifically to such a system in the game of golf for determining the distance of a golf ball from a plurality of known positions.

The Global Positioning System (GPS) is a satellite-based radio navigation system capable of determining continuous position, velocity and time information for an unlimited number of users. The NAVSTAR (NAVigation Satellite Timing and Ranging) GPS is an absolute positioning system capable of providing accurate three dimensional position information. When completed, the GPS satellite constellation will comprise 24 satellites distributed throughout six orbital planes equally spaced around the equator and inclined at an angle of 55 degrees. The satellites will orbit at an altitude of approximately 11,000 nautical miles and have an orbital period of 12 sidereal hours. This design ensures that signals from at least four GPS satellites can be received at any point on or above the earth's surface at any point in time. A discussion of GPS technology and applications is given in Harris and Sikorski, *GPS Technology and Opportunities,* presented at Expo Comm China '92, Beijing, China, Oct. 30–Nov. 4, 1992.

A single receiver of GPS signals is capable of determining receiver absolute positioning in terms of latitudinal, longitudinal and altitudinal coordinates. Two or more such receivers can be used to determine the relative position between the receivers in real time. This method is known as differential positioning and is much more accurate than absolute positional sensing since the errors associated with the absolute positioning are substantially cancelled when one absolute position is subtracted from a second absolute position, provided that the measured distance is small compared to the distance between the receivers and the satellites.

Researchers have recently developed systems utilizing GPS technology to provide highly accurate differential positioning. Examples of such differential positioning systems for surveying applications are given in U.S. Pat. Nos. 5,077,577, 5,148,179, 5,155,490 and 5,194,871. U.S. Pat. No. 5,077,557 discloses a surveying instrument with a global positioning receiver for use in situations wherein a direct line of sight to GPS satellites is obscured in part, thereby preventing complete utilization of the GPS system. The instrument is operated from a remote measuring point and aimed at the point to be measured with a sighting device. The vertical setting of the instrument is monitored by a vertical sensor, thus enabling the instrument to determine the three coordinates of the location to be surveyed. U.S. Pat. No. 5,148,179 discloses a method for accurately determining the position of a roving signal receiver relative to the position of a reference receiver whose position is known with sufficient accuracy. U.S. Pat. No. 5,155,490 discloses a geodetic surveying system using at least three GPS base stations, each having a satellite receiver operating in conjunction with a highly accurate clock. Finally, U.S. Pat. No. 5,194,871 discloses a method and system for accurately measuring the distance between a pair of survey marks by separating the received GPS signals into upper and lower side band components. These separate components are filtered, converted to digital form, multiplied together and then digitally analyzed to determine the power and phase of the carrier signal received from each satellite. Differences in Doppler shift are utilized to distinguish the carrier signals of the different satellites. The power and phase measurements of each of the carrier signals are then further processed to obtain highly accurate coordinates for the locations being surveyed.

Two examples of GPS systems developed for the aircraft industry are U.S. Pat. Nos. 4,894,655 and 5,101,356. U.S. Pat. No. 4,894,655 discloses a GPS landing assistance system comprising a fixed receiver station located in the vicinity of the landing zone and an on-based receiving station located in each air craft. The fixed receiving station contains a computing device for supplying correction data representing the deviation between the estimated receiver position and a reference position. The on-board receiving station contains a receiver for receiving GPS signals and a separate receiver for receiving correction data from the fixed receiving station, wherein an estimated distance between the aircraft and the landing zone can be adjusted with the correction data to provide more accurate position information. U.S. Pat. No. 5,101,356 discloses a moving vehicle attitude measurement system utilizing three GPS receivers coupled to phase comparators to establish the phase difference between the RF carrier signals of the three possible pairs of receivers, to calculate a true attitude value of roll, pitch and yaw.

When extremely accurate distance information is required, the aforementioned systems provide the necessary embodiments to achieve such accuracy but can be cost prohibitive to an average consumer. When less accurate distance information is required, such as for shot distance and distances remaining to a green or pin location in the game of golf, a compact, portable and low cost GPS-based measuring apparatus would be extremely desirable. Because of the non-critical nature of the accuracy of distance information in the game of golf, such a device need only be accurate to within a few meters. Moreover, since there is no need to know such information until after the golfer reaches the location of the played shot, the measuring apparatus need not provide real-time measurement data. Thus, a low-cost system, accurate to within a few meters, capable of measuring the distance between a particular ball position and known reference positions would be an ideal diagnostic tool for the game of golf.

SUMMARY OF THE INVENTION

It is the principal object of the present invention to provide an inexpensive golf diagnostic system capable of receiving GPS signals and determining the position coordinates of the diagnostic system to allow a user to measure the distance of any played shot and the distances of that shot to a particular known green location and corresponding pin location.

It is another object of the present invention to provide means within the golf diagnostic system for receiving correction data signals transmitted from a fixed GPS system receiving station to adjust the position coordinates and thereby produce more accurate position coordinates.

It is another object of the present invention to provide means within the diagnostic system for recording the number of putts taken to finish play on a particular hole and adding this number to the number of shots taken on that hole before putting to provide a score for that hole. It is another object of the present invention to provide means within the diagnostic system for automatically incrementing the hole counter to the next in a sequence of holes to be played.

It is another object of the present invention to provide means for adding the scores for each particular hole to provide a total score for the game played.

It is another object of the present invention to provide means for generating hole statistics and game statistics, thereby providing the user with summary information of, for example, hole score, distance played on each shot and the club used on each shot.

It is another object of the present invention to provide means for computing an average distance played per club from past game summaries and for determining a suggested club to be used based upon the distance remaining between a played shot and either the particular green or corresponding pin location.

It is another object of the present invention to provide means for allowing the user to enter penalty stroke information and for adjusting the hole score based upon this information, means for disregarding a particular measurement and means for starting and ending a game of golf.

The golf diagnostic system of the present invention is equipped with a suitable I/O port to allow the input of golf course information such as, for example, green locations, pin locations and par scores for each hole and to further allow the output of hole and game statistics for further manipulation by a computer.

These and objects of the present invention will become more apparent from the following description of the preferred embodiment.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
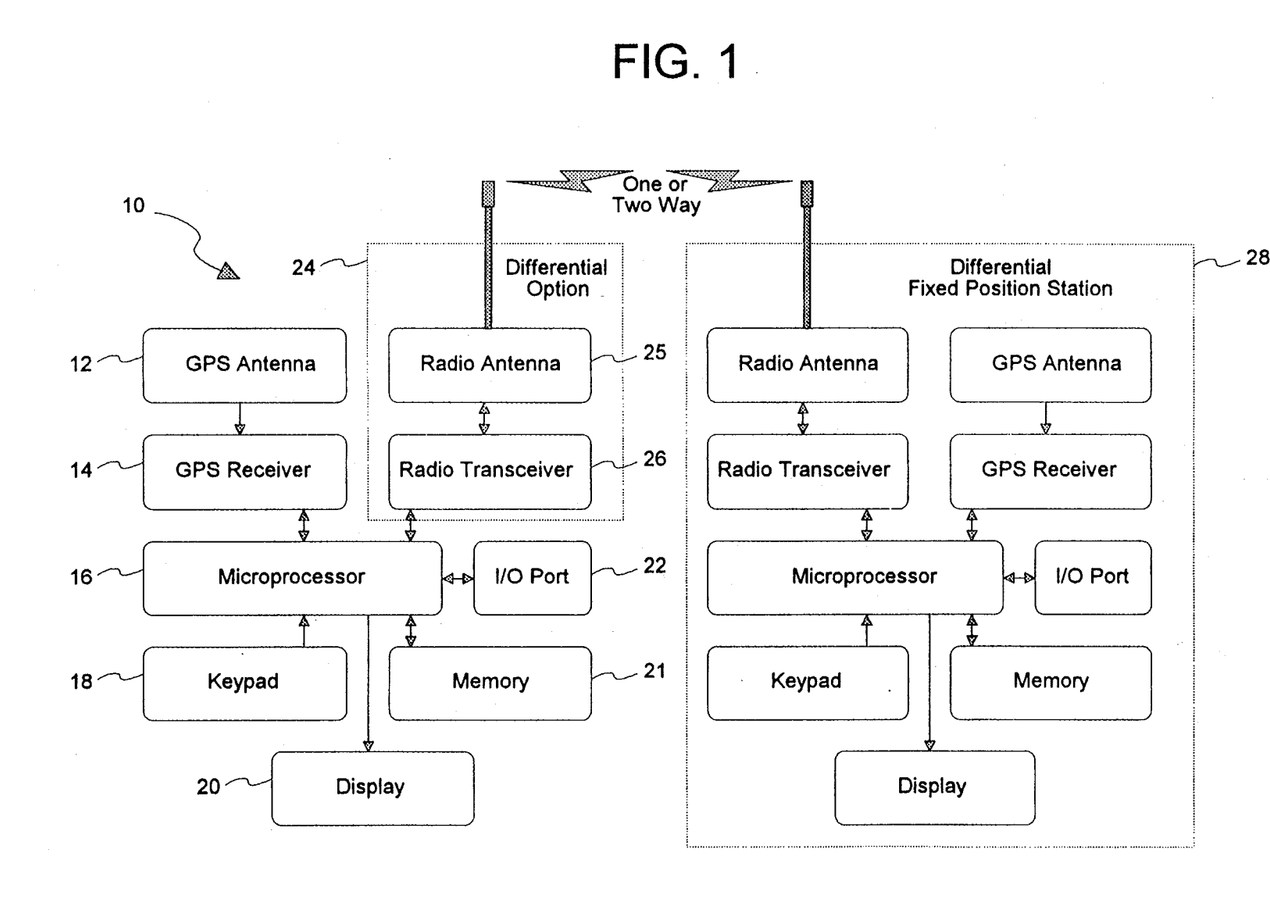
FIG. 1 is a block diagram of a GPS golf diagnostic system according to the present invention.

Referring now to FIG. 1, a block diagram of a GPS golf diagnostic system according to the present invention is shown. GPS antenna 12 and GPS receiver 14 act in concert to continuously receive GPS position data from a plurality of earth orbiting GPS satellites. Keypad 18 is comprised of pushable keys that cause microprocessor 16 to perform predetermined functions when activated. One of these predetermined functions is receiving present position data from GPS receiver 14 in the form of latitudinal, longitudinal and altitudinal coordinates, retrieving a reference position from memory 21, in terms of the same coordinate system, computing the distance between the two positions and displaying the distance information on display 20. A Liquid Crystal Display (LCD) is the preferred embodiment of display 20, but other known methods such as Light Emitting Diode (LED) or Cathode Ray Tube (CRT) display methods, for example, may be used. The reference position contained in memory 21 is the starting position of the ball before the shot was played and may be either the starting position of the particular hole being played, ie. the tee position, the at-rest position of the ball from the previous shot or any at-rest ball position such as at a driving range, practice area or field.

Microprocessor 16 is also capable of retrieving other known GPS position data from memory 21, such as green location coordinates or pin position coordinates for the particular hole being played, computing the distances between the present ball position and the known position and displaying the distance information on display 20 according to a user prompt from keypad 18.

The present invention contemplates several methods of receiving the known position data into memory 21. According to one preferred embodiment, the known position data may be entered into memory 21, via microprocessor 16, by a user through keypad 18. According to another preferred embodiment, I/O port 22 interfaces with an external source, wherein the external source enters the known data through microprocessor 16, into memory 21. I/O port 22 may comprise, for example, a RS-232 port for interfacing with a computer, or a card reading configuration for accessing data from a magnetic source on or within a card.

Memory 21 contains pin position data for 18 holes and should be capable of storing pin position data for at least nine holes. Memory 21 also contains green location data for 18 holes and should be capable of storing green location data for least 9 holes. In one preferred embodiment, green location data consists of the longitudinal, latitudinal and altitudinal coordinates of the point on the edge of the green, midway between the edges of the fairway and closest to the corresponding tee location, but other green location coordinates, such as the point on the green closest to the tee location for dog-leg configuration holes, may be used.

According to one preferred embodiment, diagnostic system 10 further includes differential correction data option 24 for receiving and transmitting GPS differential correction data. Option 24 includes radio antenna 25 and radio transceiver 26 for receiving radio signals from and transmitting radio signals to a local differential fixed position station 28, at different frequencies than the GPS signals. Local differential fixed position station 28 should be fixed in position and be capable of determining, receiving and transmitting GPS differential correction data. One method of determining GPS correction data includes receiving GPS position data by fixed position station 28, computing the distance between fixed position station 28 and a known position using the GPS position data, comparing the computed distance with the known distance and then computing coordinate offsets where these coordinate offsets are added to the incoming GPS position data to yield a more accurate estimate of the known distance. In one preferred embodiment, differential fixed position station 28 is comprised of a GPS diagnostic system similar to diagnostic system 10 but with the added ability to generate and transmit differential correction data, fixed in a known, stationary position such as a golf pro shop, club house or nearby city. Microprocessor 16 receives GPS correction data from fixed position station 28 as often as about once per second and feeds this data into GPS receiver 14 which then adjusts incoming latitudinal, longitudinal and altitudinal coordinates by the corresponding offset values to provide a new and more accurate estimate of the present position of diagnostic system 10. In another preferred embodiment of differential data correction option 24, transceiver 26 must also be capable of decoding subscription key information in order to access the differential correction data.

Figure 2:
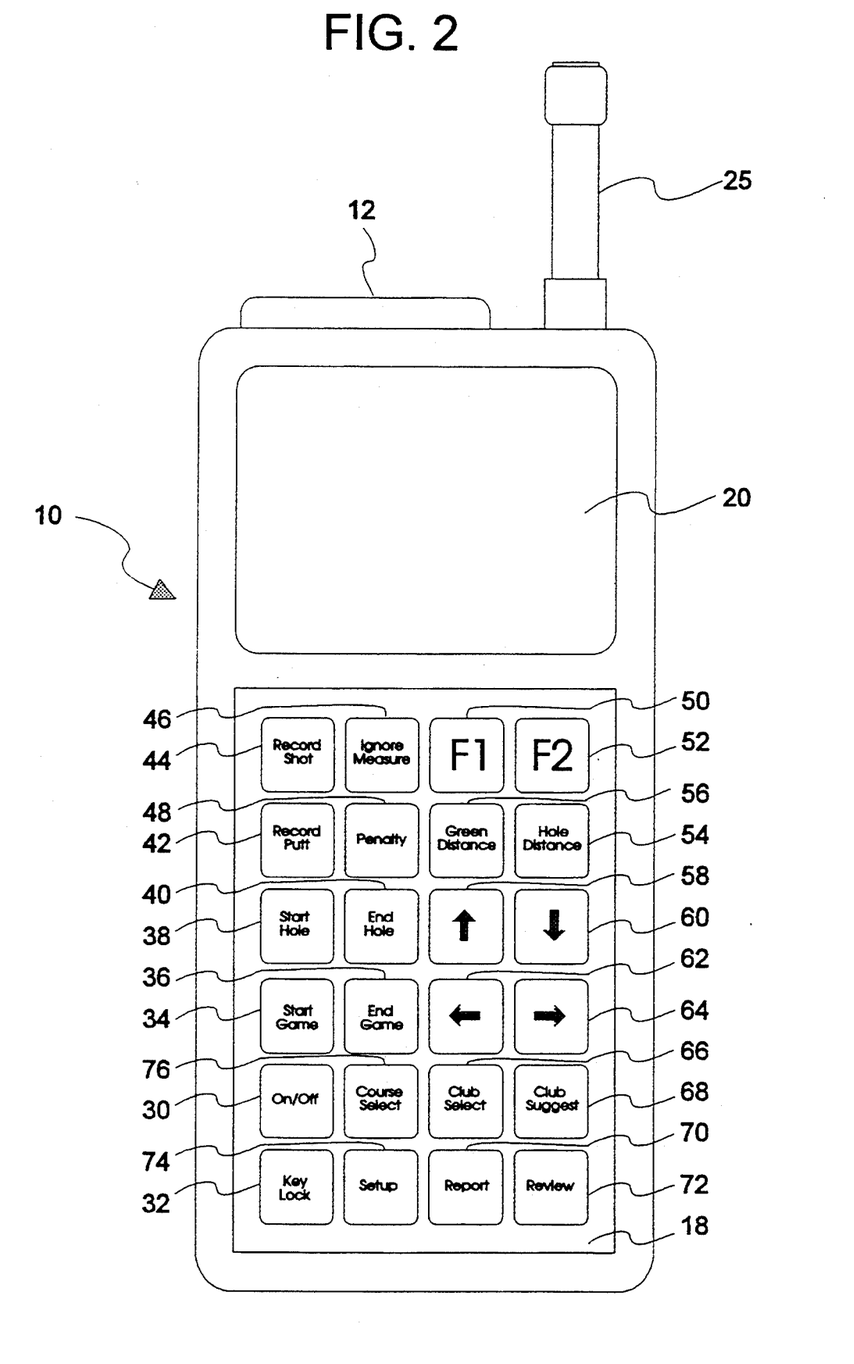
FIG. 2 shows a conceptual illustration of a GPS golf diagnostic system according to the present invention.

Referring now to FIG. 2, an example layout of keypad 18, according to a preferred embodiment of the present invention is shown. In FIGS. 3(*a*)–(*g*) and FIG. 4, a flow chart for the golf diagnostic system algorithm according to the present invention is shown. Microprocessor 16 is responsible for periodically monitoring keypad 18 and performing various predefined functions according to the key pushed. Typically, microprocessor 16 executes the algorithm depicted in FIGS. 3(*a*)–(*g*) and FIG. 4 many times a second so that a continuous monitoring of inputs, resulting computations and information display occurs in real-time fashion. The algorithm steps will hereafter be described with reference to the various keys on keypad 18 as shown in FIG. 2.

Referring now to FIG. 3(*a*), when the power is supplied to diagnostic system 10 by pressing key 30, microprocessor 16 enters an initialization step 100 wherein it verifies that GPS position data is properly entering system 10, and sets all system and game variables, to be discussed hereinafter, to default values. At step 102, the algorithm tests whether any errors occurred in the initialization step and, if so, displays a particular message to display 20 at step 104, according to the detected error. Upon receiving a user keystroke, the algorithm returns to initialization step 100.

Figure 3A:
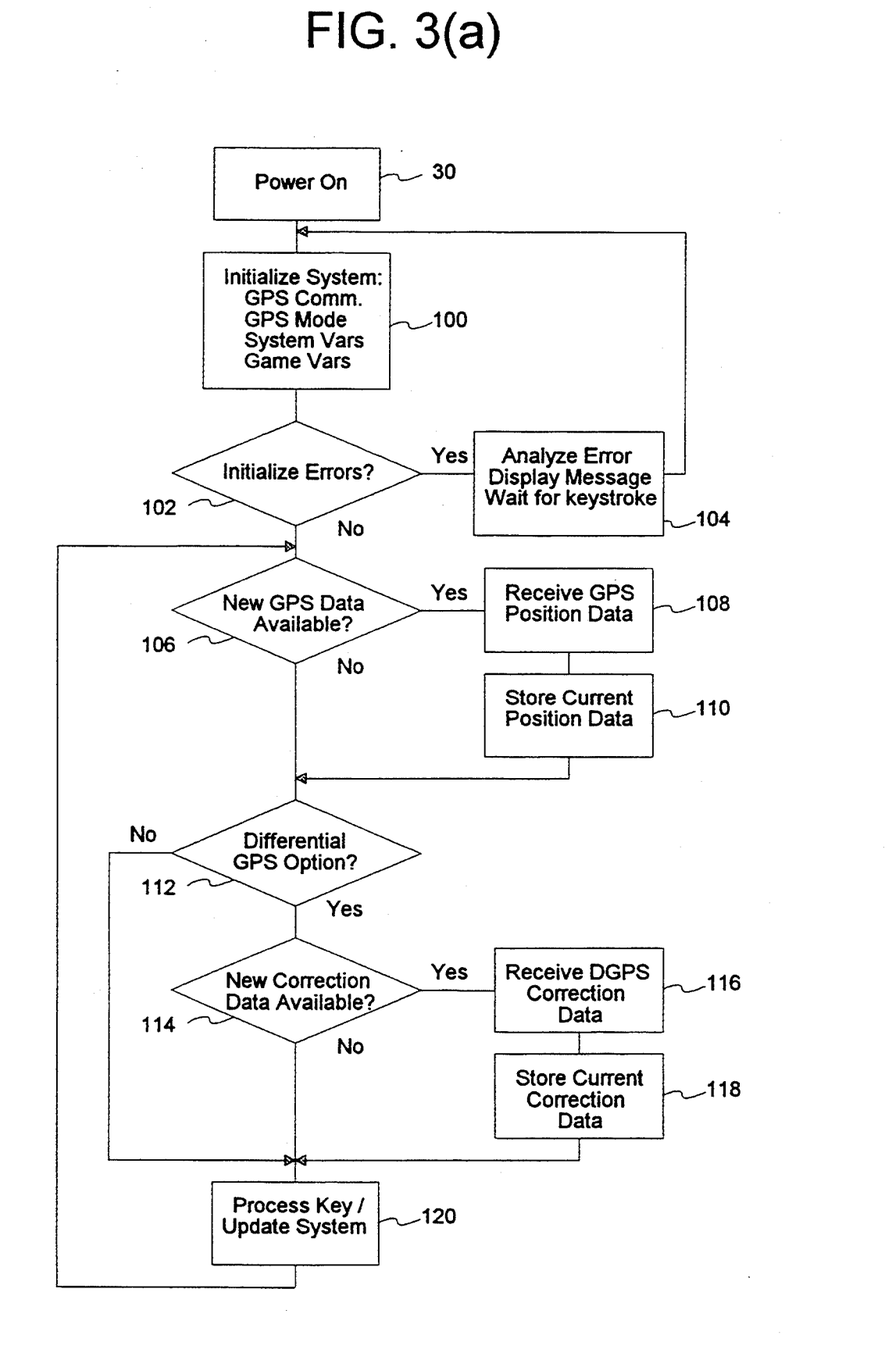
FIG. 3(a)-(g) is a flow chart depicting software steps or interfacing the keypad functions with the GPS golf diagnostic system according to the present invention.
Figure 3B:
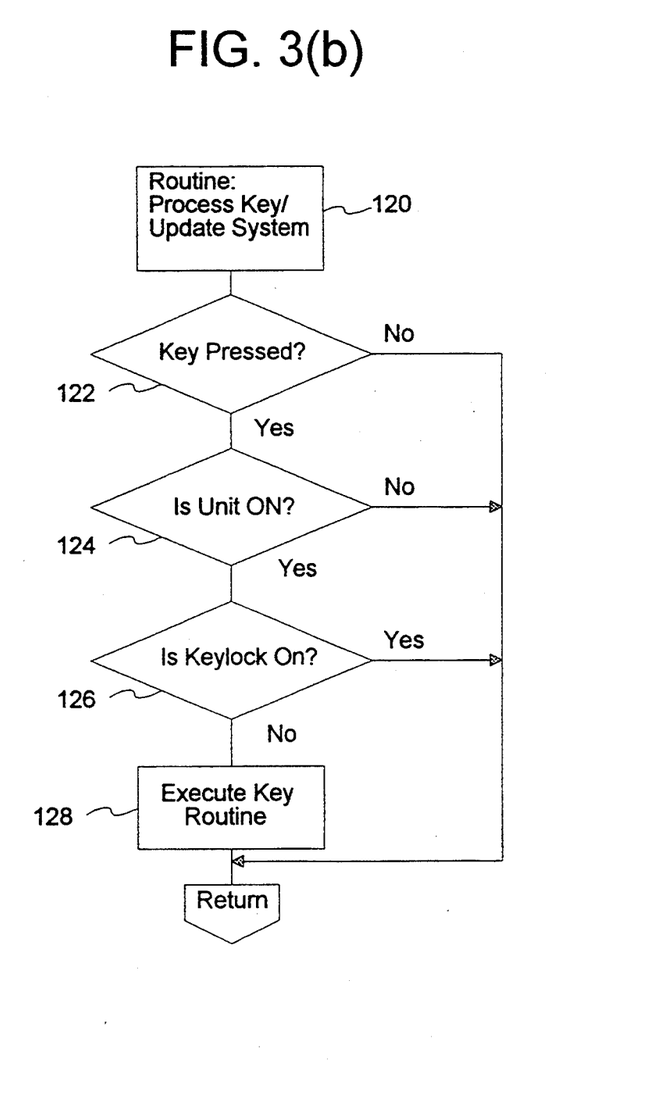

If no initialization errors are detected at step 102, GPS receiver 14 is tested at step 106 to see if any new GPS data is available since the previous algorithm cycle. This condition is satisfied if the diagnostic system 10 has been moved from the position that it occupied during the previous algorithm cycle and the algorithm advances to step 108 where microprocessor 16 receives the current GPS position data, and then stores this data in memory 21 at step 110.

After the current position data is stored at step 110, or if no new position data was available at step 106, the algorithm advances to step 112 and tests the diagnostic system 10 to see if it contains differential option 24. If so, it tests radio transceiver 26 at step 114 to see if fixed position station 28 has produced new position correction data since the previous algorithm cycle. If so, then microprocessor 16 receives the new correction data at step 116 and stores this data into memory 21 at step 118. After the new correction data is stored at step 118, or if no new correction data was available at step 114, or if diagnostic system 10 does not contain differential option 24, the algorithm proceeds to Key Processing Routine 120 before returning to step 106 for a algorithm cycle.

Referring now to FIG. 3(*b*), key processing routine 120 is commenced at step 122 by testing keypad 18 to see if a key has been pressed since the previous algorithm cycle. If not, the algorithm returns to step 106 for a new algorithm cycle. If a key press has been detected at step 122, the "ON/OFF" status of diagnostic system 10 is tested at step 124. If diagnostic system 10 is "OFF", the algorithm returns to step 106 for a new algorithm cycle. If diagnostic system 10 is "ON", the algorithm tests the Keylock status, to be discussed more fully hereinafter, at step 126. If the Keylock status is "ON", then microprocessor 16 is inhibited from performing any key functions and the algorithm returns to step 106 for a new algorithm cycle. If the Keylock status is "OFF", the algorithm proceeds to Key Execution Routine 128.

Referring now to FIG. 3(*c*), Key Execution Routine 128 provides particular functions to be performed when the various keys on keypad 18 are pressed. Routine 128 is performed by testing the keys, in a predetermined sequence, to see which key is being pressed. When the pressed key is found, then the hereinafter described function is performed, display 20 is updated and the algorithm returns to step 106 for a new algorithm cycle.

Figure 3C:
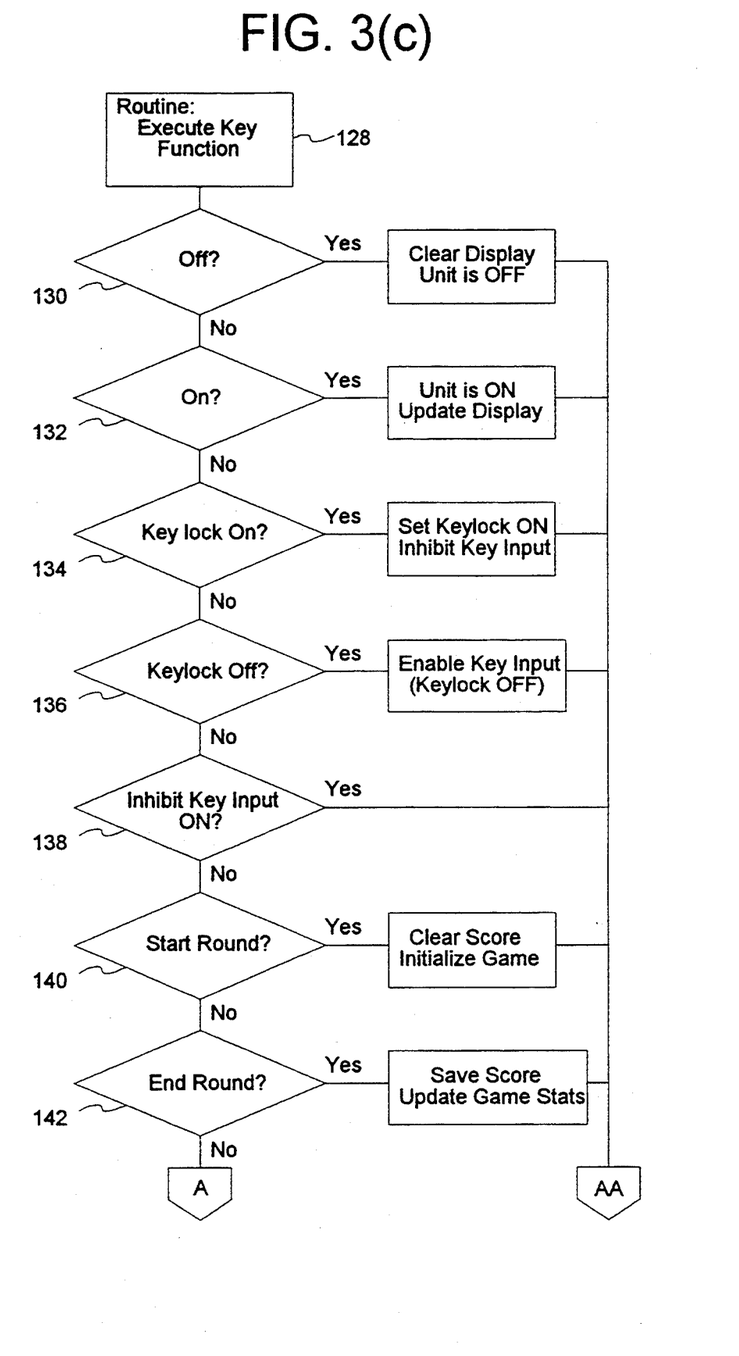

At step 130, if "ON/OFF" key 30 is pressed and the "ON/OFF" status of diagnostic system 10 is presently "ON", then microprocessor 16 clears display 20 and sets the "ON/OFF" status of diagnostic system 10 to "OFF". At step 132, if "ON/OFF" key 30 is pressed and the "ON/OFF" status of diagnostic system 10 is presently "OFF", then microprocessor 16 updates display 20 with the most recent diagnostic information according to a predetermined display format and sets the "ON/OFF" status of diagnostic system 10 to "ON". At step 134, if the Keylock key 32 is pressed and the Keylock status is currently "OFF", then microprocessor 16 sets the Keylock status to "ON" and inhibits any further key input. At step 136, if the Keylock status is currently "ON", then microprocessor 16 sets the Keylock status to "OFF" and enables key input. At step 138, the Keylock status of diagnostic system 10 is tested before testing any of the remaining keys. If the Keylock status is "ON" then the algorithm returns to step 106 for a new algorithm cycle. If the Keylock status is "OFF", then the remaining keys are tested.

At step 140, if the Start Game key 34 is pressed, microprocessor 16 clears the previous game score and initializes the game by setting a hole counter to the first hole in a sequence of holes to be played and retrieves the course information for this hole from memory 21.

At step 142, if the End Game key 36 is pressed, then microprocessor 16 stores all game statistics into memory 21. Examples of game statistics include game score, scores for each hole, number and types of clubs used, distances measured for each recorded shot and average distance achieved for each club used.

Continuing to FIG. 3(*d*), if the Start Hole key 38 is pressed at step 144, then microprocessor 16 receives that longitudinal, latitudinal and altitudinal coordinates, for the current position of diagnostic system 10, from GPS receiver 14, and stores these reference position coordinates in memory 21. In one preferred embodiment, the Start Hole key 38 is pressed when diagnostic system 10 is physically located as close to the ball, as it sits on the particular tee, as possible to provide the most accurate determination of the reference position coordinates by diagnostic system 10.

Figure 3D:
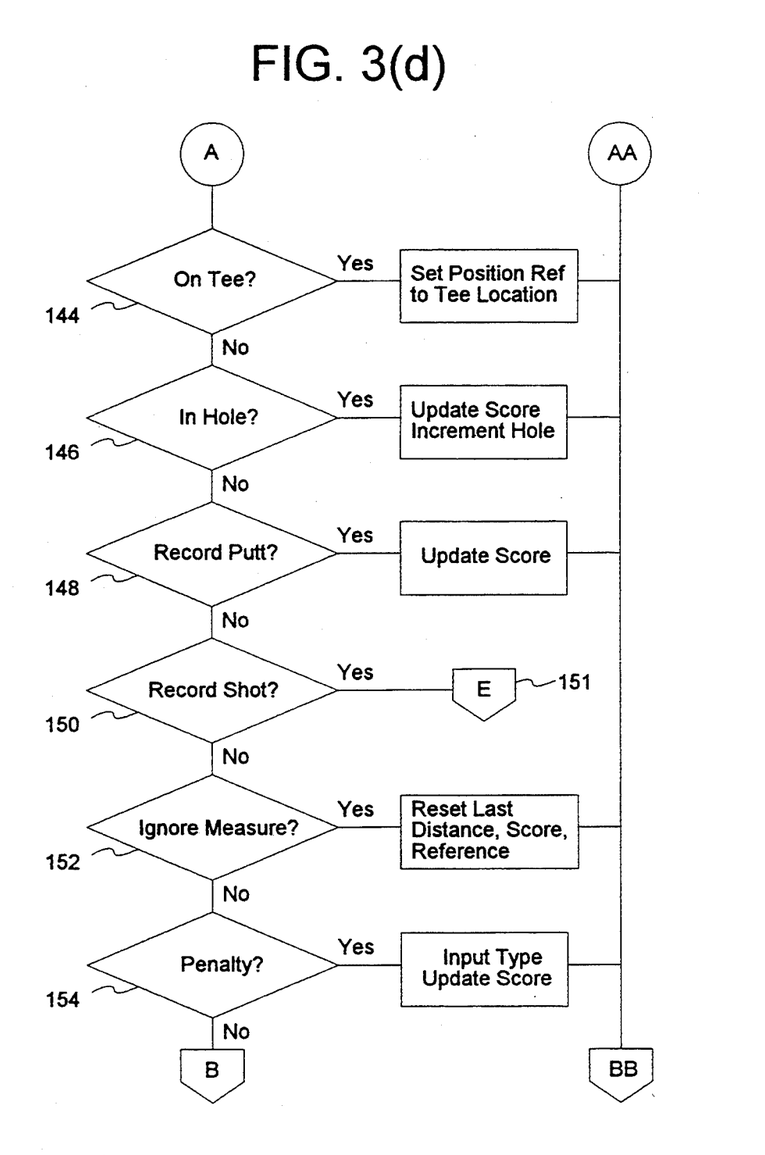

At step 146, if the End Hole key 40 is pressed, microprocessor 16 stores the accumulated information for the completed hole in memory 21, increments the hole counter to the next in a sequence of holes to be played and retrieves the course information for the next hole from memory 21.

At step 148, if the Record Putt key 42 is pressed, microprocessor 16 will prompt the user, through display 20, for the number of putts taken to finish play on the present hole, and then add this number to the number of shots recorded for the present hole to produce a score for that hole.

Figure 4:
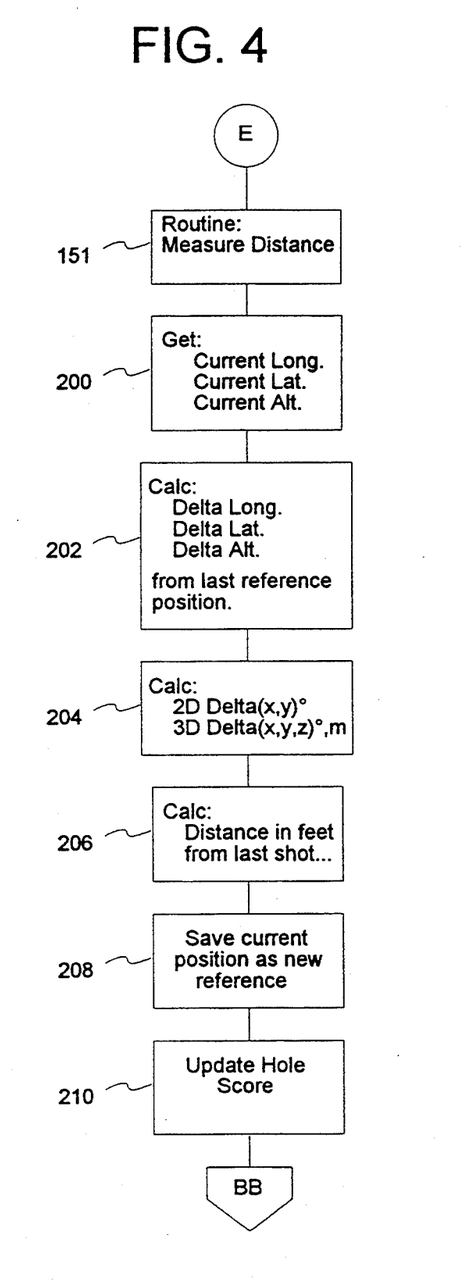
FIG. 4 is a flow chart depicting software steps for measuring a distance between GPS position data and a reference point in a GPS golf diagnostic system according to the present invention.

At step 150, if the Record Shot key 44 is pressed, Routine 128 executes Distance Function 151 shown in FIG. 4.

Referring now to FIG. 4, Distance Function 151 begins at step 200, wherein microprocessor 16 receives longitudinal, latitudinal and altitudinal position coordinates, for the present position of diagnostic system 10, from GPS receiver 14. At step 202, microprocessor 16 computes the differences between each of the present coordinates and the corresponding coordinates from the reference position stored in memory 21. At step 204, microprocessor 16 computes a two-dimensional distance in feet between the present position coordinates and the reference position coordinates, using the differences in latitudinal and longitudinal coordinates found in step 202, and a three-dimensional distance by including altitudinal information in the computation, in terms of feet. At step 206, microprocessor 16 converts the distances, found in step 204, from degrees and degrees plus minutes to feet. At step 208, microprocessor 16 stores either of the distances found in step 206 in memory 21 as the new reference position. Finally, at step 210, microprocessor updates the score by adding one to the score for the hole being played. In one preferred embodiment, the Record Shot key 44 is pressed when diagnostic system 10 is physically located as close as possible to the at-rest ball position to provide the most accurate determination of current position coordinates by diagnostic system 10. Any errors in the measurement of this position and the reference position are substantially cancelled when step 202 of Distance Function 151 is performed because the sources of error in the two measurements are the same as for a differential positioning system. Thus, when the two positions are differenced, the errors associated with measurements of the absolute position coordinates are substantially cancelled.

Referring back to FIG. 3(d), at step 152, if the Ignore Measure key 46 is pressed, microprocessor 16 resets the distances computed in Distance Function 151 to their previous values, decrements the hole score by one and resets the reference position coordinates to their previous values. This function is intended to provide the ability to "erase" a mistaken or erroneous position measurement.

At step 154, if the Penalty key 48 is pressed, microprocessor 16 interfaces with display 20 to present possible penalty sources to the user. Examples of such penalty sources include, out-of-bounds, a ball in the water and a lost ball. The user then manipulates the Arrow keys 58–64 and the F1 key 50, more fully described hereinafter, to highlight and then select the appropriate penalty source. Microprocessor 16 receives the selection and adds the number of strokes, corresponding to the selected penalty, to the hole score.

Figure 3E:
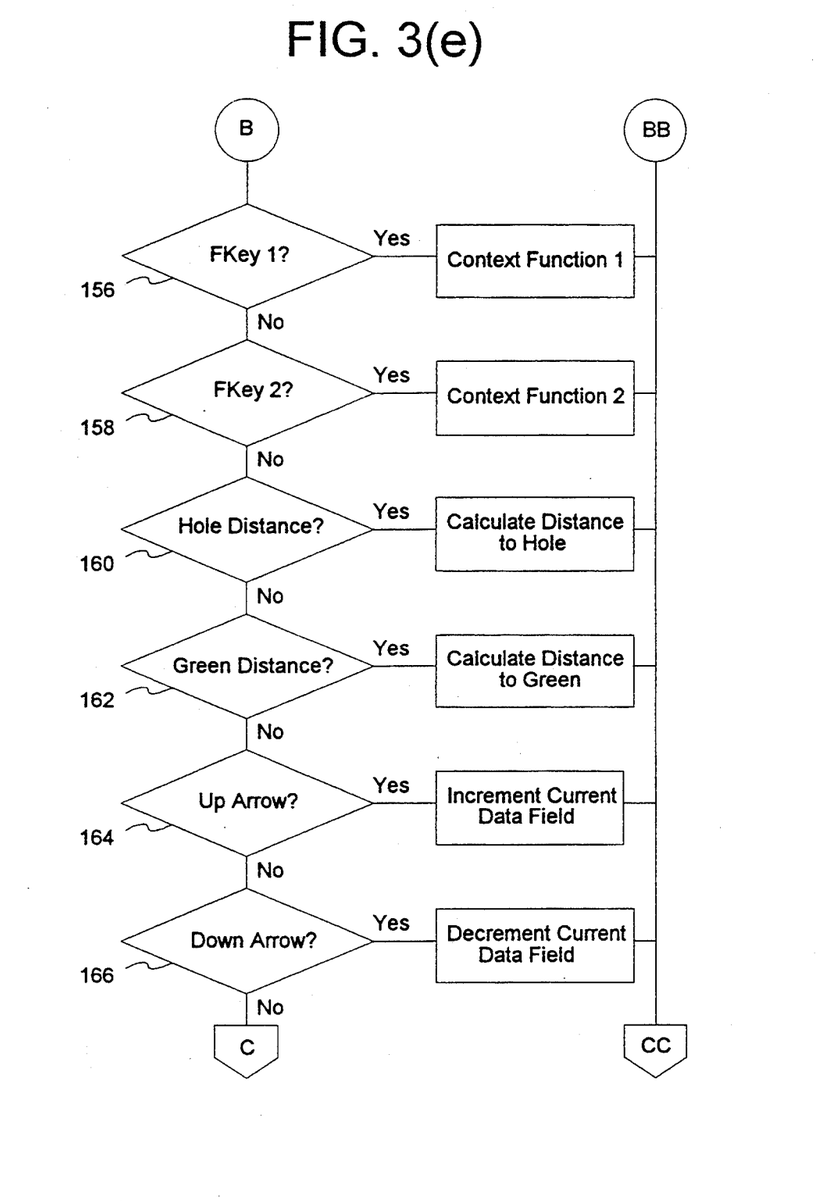

Continuing to FIG. 3(e), at step 156, if the F1 key 50 is pressed, microprocessor 16 receives highlighted information from display 20 for further processing. The penalty function of the previous paragraph provides one example of the use of the F1 key 50.

At step 158, if the F2 key 52 is pressed, microprocessor 16 enables I/0 port 22 to either accept data from an external source to be stored in memory 21 or to provide data to an external source for further processing. The F2 key 52 functions in the same way as the F1 key 50 in that it selects highlighted information from display 20 and causes microprocessor 16 to receive the information and enable I/O port 22 to either receive or provide data. In one preferred embodiment, the F2 key 52 acts in concert with microprocessor 16 and I/0 port 22 to accept golf course information, including the course name, pars and lengths of the particular holes, pin positions and green positions from an external source such as a computer or magnetic card, and to provide game and hole statistics to an external source, such as a computer, for further manipulation and presentation of the game statistics.

At step 160, if the Hole Distance key 54 is pressed, microprocessor 16 retrieves the coordinates of the pin position for the particular hole being played from memory 21 and computes the distance between the at-rest position of the golf ball and the pin position, using the same method as disclosed in Distance Function 151, and displays the distance information at display 20.

At step 162, if the Green Distance key 56 is pressed, microprocessor 16 retrieves the coordinates of the green position for the particular hole being played from memory 21 and computes the distance between the at-rest position of the golf ball and the green position, using the same method as disclosed in Distance Function 151, and displays the distance information at display 20.

At steps 164 and 166, 168 and 170, if either the Up-Arrow key 58, Down-Arrow key 60, Left-Arrow key 62 or Right-Arrow key 64 are pressed, microprocessor 16 moves a highlighted area on display 20 in the corresponding direction. As described in previous paragraphs, these keys are used in conjunction with predefined display screens to allow a user to choose among various functions to be performed.

Figure 3F:
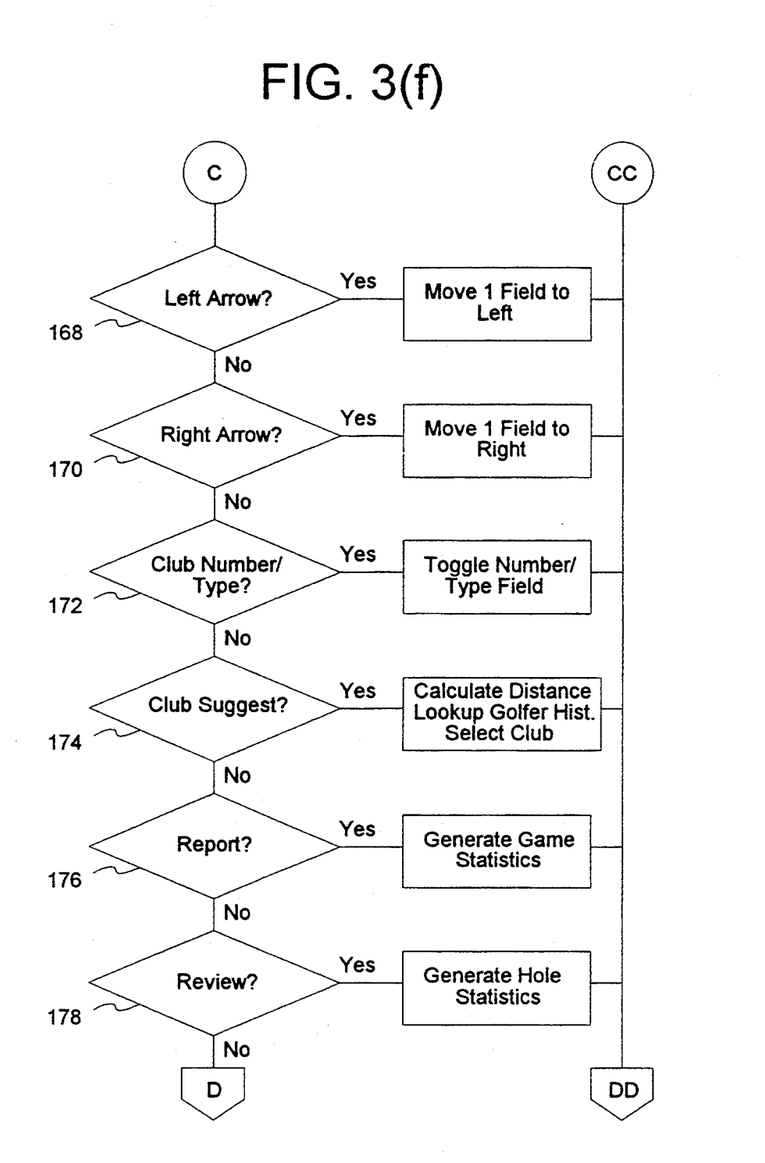

Continuing now within FIG. 3(f), at step 172, if the Club Select key 66 is pressed, microprocessor 16 displays a menu of golf club numbers and types at display 20. The user manipulates the Arrow keys 58–64 until the highlighted area of display 20 indicates the preferred club and then presses the F1 key 50 to thereby cause microprocessor 16 to receive the chosen golf club information and store it, along with the distance information previously discussed, in memory 21 for the particular hole being played.

At step 174, if the Club Suggest key 68 is pressed, microprocessor 16 computes the distance between the present at-rest ball position and the pin position, searches memory 21 for a list of the user's golf clubs and average distances achieved from each through previous play, compares this list with the distance remaining to the pin position, chooses the golf club with an average distance closest in value to the distance remaining and displays the chosen golf club number and type at display 20.

At step 176, if the Report key 70 is pressed, microprocessor 16 computes statistics for the game just played, such as total game score, scores obtained on each hole, golf clubs used and distances attained for each shot and average shot distance attained by using each club, and interfaces with display 20 to prompt the user to chose the method of reporting. In one preferred embodiment, the user manipulates Arrow keys 58–64, F1 key 50 and/or F2 key 52 to either display the game statistics at display 20 or send the game statistics to I/O port 22 for receipt by an external system.

At step 178, if the Review key 72 is pressed, microprocessor 16 computes statistics for the most recent hole played, such as hole score, golf clubs used and distances achieved for each shot, par score for the hole and yardage of the hole, and displays this information at display 20.

Figure 3G:
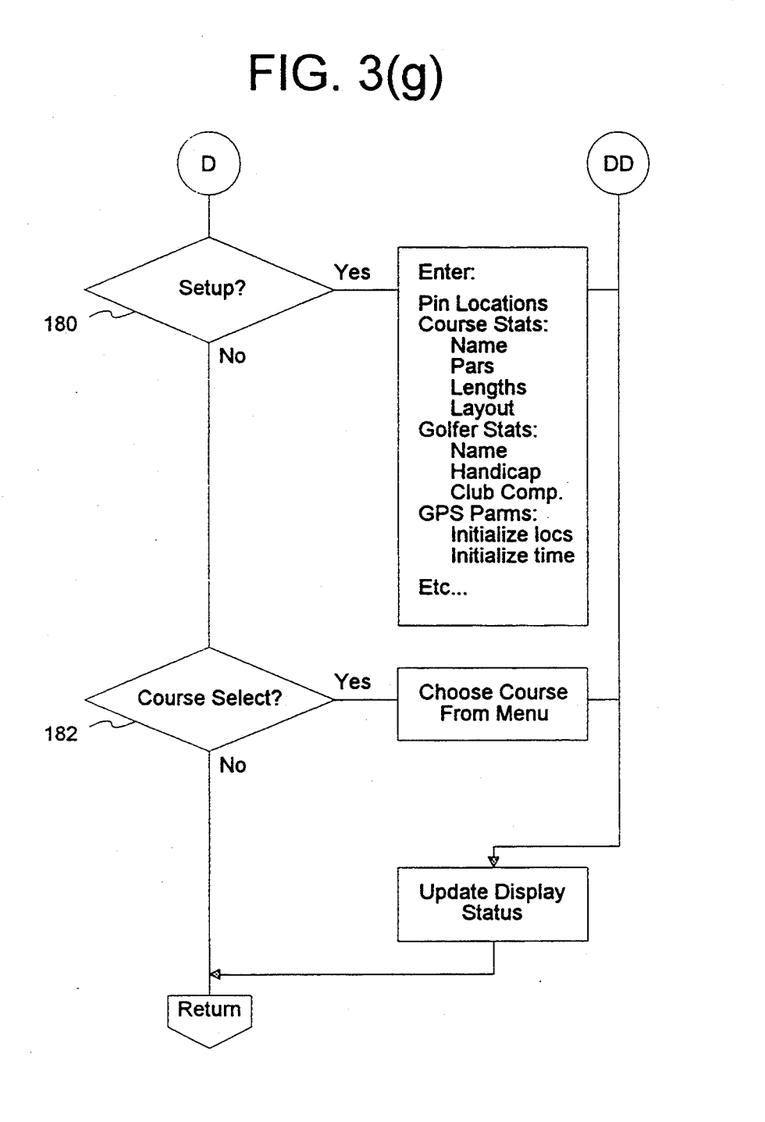

Referring now to FIG. 3(g), at step 180, if the Setup key 74 is pressed, microprocessor interfaces with display 20 to allow the user to manipulate the Arrow keys 58–64, F1 key 50 and F2 key 52 to input golf course and user information either through keypad 18 or through I/O port 22, according to a predetermined menu. In one preferred embodiment, the user enters course information, such as course name, par scores for the course and for each hole, lengths of the various holes and coordinates of the various pin and green positions through the keypad 18 according to a predetermined menu. In another preferred embodiment, the user enters the same course information via I/O port 22 from an external source such as a computer or magnetic card. In addition to the above functions, microprocessor 16 also calibrates the GPS receiver 14 over a preset period. In one preferred embodiment, the Setup key 74 is pressed at a position of known coordinates. Microprocessor 16 then receives differential correction data and sends it to GPS receiver 14 to improve positional accuracy, thereby providing a more accurate estimate of the measured position of diagnostic system 10. Microprocessor 16 looks for differential correction data every time the Start Hole key 38 or Record Shot key 44 are pressed.

Finally, at step 182, if the Course Select key 76 is pressed, microprocessor 16 interfaces with display 20 to allow the user to enter course information by choosing among golf courses currently in memory 21, according to a menu system. In one preferred embodiment, user manipulates Arrow keys 58–64 and the F1 key to highlight and choose a golf course from the list of courses on the menu. Microprocessor 16 then automatically enters the course information for the particular course chosen into the previously discussed Setup function.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A portable golf diagnostic system for determining the distance of a golf ball from a known position, said diagnostic system comprising:
   a receiver for receiving radio signals transmitted from a plurality of earth orbiting GPS satellites;
   a processor for processing the radio signals and determining therefrom the position of said diagnostic system according to the latitudinal, longitudinal and altitudinal coordinates of said diagnostic system;
   a first enabler for enabling said processor to receive the radio signals proximate to an at-rest golf ball to thereby determine an at-rest ball position;
   memory storing latitudinal, longitudinal and altitudinal coordinates of a plurality of pin positions; and
   a second enabler for enabling said processor to determine a three-dimensional distance between the at-rest ball position and the pin position corresponding to the hole being played, thereby permitting the remaining distance to the pin position after a played shot to be readily ascertained to within a few meters of the actual remaining distance to the pin position.

2. The golf diagnostic system of claim 1, wherein said memory includes a first storage location for storing a reference position, and said first enabler further enables said processor to store the at-rest ball position as the reference position in said first storage location.

3. The golf diagnostic system of claim 2, further comprising a third enabler for enabling said processor to receive the radio signals proximate to a starting ball position to thereby determine an initial position, said third enabler further enabling said processor to store the initial position as the reference position in said first storage location.

4. The golf diagnostic system of claim 3, further comprising a fourth enabler for enabling said processor to determine a three-dimensional distance between the at-rest ball position and the reference position, wherein the reference position corresponds to one of the initial position and the previous at-rest ball position, thereby permitting the distance of a played shot to be readily ascertained to within a few meters of the actual played shot distance.

5. The golf diagnostic system of claim 4, wherein the initial position corresponds to a tee position for the particular hole being played.

6. The golf diagnostic system of claim 5, wherein said memory further includes storing latitudinal, longitudinal, and altitudinal coordinates of a plurality of green positions corresponding to the positions on each of the several greens that are located closest to the corresponding tee positions for each of the several holes.

7. The golf diagnostic system of claim 6, further comprising a fifth enabler for enabling said processor to determine a three-dimensional distance between the at-rest ball position and the green position for the particular hole being played.

8. The golf diagnostic system of claim 7 further comprising a sixth enabler for enabling the diagnostic system to measure a known distance, enabling said processor to compute the known distance, further enabling said processor to determine coordinate offsets for adjusting the received radio signals, and enabling said receiver to receive the coordinate offsets from said processor, wherein said receiver adjusts the received radio signals using the coordinate offsets to thereby reflect a more accurate measurement of the known distance.

9. The golf diagnostic system of claim 8, wherein said receiver receives the coordinate offsets from said processor to adjust all of the radio signals received by said diagnostic system.

10. The golf diagnostic system of claim 9, wherein said memory includes a second storage location for storing a shot counter, said third enabler further enables said processor to reset the shot counter to zero, said first enabler further enables said processor to increment the shot counter by one, and further comprising a seventh enabler for enabling said processor to add the number of putts played to finish a particular hole to the shot counter, thereby producing a score for the particular hole.

11. The golf diagnostic system of claim 10, wherein said memory includes a third storage location for storing a total score for the game being played, and further comprising an eighth enabler for enabling said processor to add the hole score to the total game score.

12. The golf diagnostic system of claim 11, wherein said sixth enabler further enables said processor to initialize said diagnostic system for a new game of golf; and said processor resets the total game score to zero, receives the pin position green position data for a particular golf course to be played, and sets a hole counter to the first hole in a sequence of holes to be played.

13. The golf diagnostic system of claim 12, further comprising a ninth enabler for enabling said processor to erase a determination of the at-rest ball position, wherein said processor resets the distance between the at-rest ball position and the reference position to its previous value, resets the distance between the at-rest ball position and the pin position to its previous value, resets the distance between the at-rest ball position and the green position to its previous value, resets the shot counter to its previous value, and resets the reference position to its previous value.

14. The golf diagnostic system of claim 13, further comprising a tenth enabler for enabling said processor to receive penalty stroke data and increase the hole score for the particular hole being played by a predetermined number corresponding to the penalty stroke data.

15. The golf diagnostic system of claim 14, wherein said memory includes a fourth storage location for storing a number and type of golf club corresponding to the club used for each measured shot, and further comprising an eleventh enabler for enabling said processor to receive the golf club data and to store the golf club data in the fourth storage location.

16. The golf diagnostic system of claim 15, wherein said memory includes a plurality of locations for storing game statistics for a plurality of games of golf including total scores, scores for each hole played, distances for each shot played, average distances achieved for each of the several clubs, and golf club data for each shot played, and further comprising a twelfth enabler for enabling said processor to store the game statistics in the plurality of memory locations.

17. The golf diagnostic system of claim 16, further comprising a thirteenth enabler for enabling said processor to search the game statistics, compare the distance between the at-rest ball position and the pin position for the particular hole being played with the average distances achieved for each of the several golf clubs, and determining the golf club with an average distance closest in value to the distance between the at-rest ball position and the pin position for the particular hole being played.

18. The golf diagnostic system of claim 17, further comprising an I/O port coupled to said processor for accessing data by said processor from a source external to said diagnostic system and for supplying data by said processor to an external receiving system.

19. The golf diagnostic system of claim 18, wherein said memory storing the plurality of pin positions contains coordinates for at least nine pin positions.

20. The golf diagnostic system of claim 19, further comprising a transceiver for receiving radio signals transmitted from a differential GPS fixed position station; wherein said processor processes the radio signals received from said differential GPS fixed position station and determines therefrom correction data for adjusting the latitudinal, longitudinal and altitudinal coordinates of said diagnostic system, the adjusted coordinates more accurately reflect the true position of said diagnostic system.

21. The golf diagnostic system of claim 20, further comprising:
a display coupled to said processor for displaying user information;
a fifteenth enabler for enabling said processor to increment forward through said display;
a sixteenth enabler for enabling said processor to decrement backward through said display;
a seventeenth enabler for enabling said processor to move left through said display; and
an eighteenth enabler for enabling said processor to move right through said display;
a nineteenth enabler for enabling said processor to generate a summary of said game statistics; a twentieth enabler for enabling said processor to generate a summary of game statistics for a particular hole;
a twenty first enabler for enabling said processor to receive pin positions and green position data for a particular golf course from said memory; and
a fourteenth enabler for enabling said processor to disregard said first through thirteenth enablers and said fifteenth through twenty first enablers.

22. A portable golf diagnostic system for determining the distance of a golf ball from a plurality of locations on a particular hole, said diagnostic system comprising:
means for receiving radio signals transmitted from a plurality of earth orbiting GPS satellites;
means for processing the radio signals and determining therefrom the position of said diagnostic system according to the latitudinal, longitudinal and altitudinal coordinates of said diagnostic system;
a first enabling means for enabling said processing means to establish a reference position corresponding to a starting ball location for the particular hole being played;
a second enabling means for enabling said processing means to determine the at-rest position of a subsequently played ball;
memory means for recording the at-rest ball position and for storing a plurality of pin positions containing the latitudinal, longitudinal and altitudinal coordinates of each of the several pin locations; and
means for determining the three-dimensional distance between the at-rest position and one of the reference position and the previously recorded ball position, and the three-dimensional distance between the at-rest position and the pin position corresponding to the present hole being played, thereby permitting the distance of a played shot and the remaining distance to the pin position after the shot to be readily ascertained to within a few meters of the actual distance of the played shot and of the actual remaining distance to the pin position respectively.

23. The portable golf diagnostic system of claim 22, further comprising:
means for receiving radio signals transmitted from a differential GPS fixed position station;
means for processing the differential station signals and determining therefrom correction data for adjusting the coordinates of said diagnostic system, wherein the adjusted coordinates more accurately reflect the true position of said diagnostic system.

24. The portable golf diagnostic system of claim 23, wherein:

said memory means stores a plurality of green positions containing the latitudinal, longitudinal and altitudinal coordinates of the points on each of the several greens that are located closest to the corresponding reference position of the hole being played; and said determining means includes means for determining the distance between the at-rest position and the green position corresponding to the present hole being played, thereby permitting the remaining distance to the green after a played shot to be readily ascertained to within a few meters of the actual remaining distance to the green.

25. The portable golf diagnostic system of claim 24, further comprising:

I/O means for accessing data by said processing means from an external source and for supplying data by said processing means to an external system.

26. The portable golf diagnostic system of claim 25, further comprising:

means for recording the number of at-rest ball position entries;

means for recording the number of putts played to finish play on a particular hole; and a first adding means for adding the number of recorded putts to the number of previously recorded at-rest ball positions on the particular hole to produce a score for the particular hole.

27. The portable golf diagnostic system of claim 26, further comprising:

a second adding means for adding the score for the particular hole to a total score for the game being played.

28. The portable golf diagnostic system of claim 27, further comprising:

means for initializing said diagnostic system for a new game of golf, wherein said initializing means sets the total score to zero and sets a hole counter to a first hole in a sequence of holes to be played.

29. A portable golf diagnostic system for determining the distance of a golf ball from a known position, said diagnostic system comprising:

a receiver for receiving radio signals transmitted from a plurality of earth orbitting GPS satellites;

a processor for processing the radio signals and determining therefrom the position of said diagnostic system according to the latitudinal, longitudinal and altitudinal coordinates of said diagnostic system;

a first enabler for enabling said processor to receive the radio signals proximate to an initial golf ball starting position, to thereby determine a reference position;

memory storing latitudinal, longitudinal and altitudinal coordinate of said reference position;

a second enabler for enabling said processor to receive golf club data, the golf club data including golf club type and golf club number; and a third enabler for enabling said processor to receive the signals proximate to an at-rest golf ball position to thereby determine a shot position, and for enabling said processor to determine a three-dimensional distance between the shot position and the reference position, thereby permitting the distance of a golf shot to be readily ascertained to within a few meters of the actual golf shot distance.

* * * * *